US011887567B2

(12) United States Patent
Brosius et al.

(10) Patent No.: US 11,887,567 B2
(45) Date of Patent: Jan. 30, 2024

(54) TECHNIQUES FOR PROCESSING CHORDS OF MUSICAL CONTENT AND RELATED SYSTEMS AND METHODS

(71) Applicant: Harmonix Music Systems, Inc., Boston, MA (US)

(72) Inventors: Eric Brosius, Arlington, MA (US); Ryan William Challinor, Cambridge, MA (US); Paul Burrowes, Woburn, MA (US)

(73) Assignee: Epic Games, Inc., Cary, NC (US)

(*) Notice: Subject to any disclaimer, the term of this patent is extended or adjusted under 35 U.S.C. 154(b) by 326 days.

(21) Appl. No.: 17/166,881

(22) Filed: Feb. 3, 2021

(65) Prior Publication Data

US 2021/0241732 A1 Aug. 5, 2021

Related U.S. Application Data

(60) Provisional application No. 62/970,619, filed on Feb. 5, 2020.

(51) Int. Cl.
*G10H 1/00* (2006.01)

(52) U.S. Cl.
CPC ..... *G10H 1/0025* (2013.01); *G10H 2210/101* (2013.01); *G10H 2210/576* (2013.01); *G10H 2240/056* (2013.01)

(58) Field of Classification Search
CPC ........... G10H 1/0025; G10H 2210/101; G10H 2210/576; G10H 2240/056
USPC ........................................................ 84/1
See application file for complete search history.

(56) References Cited

U.S. PATENT DOCUMENTS

| | | | | |
|---|---|---|---|---|
| 4,192,212 A * | 3/1980 | Yamaga | G10H 7/00 84/684 |
| 4,433,601 A * | 2/1984 | Hall | G10H 1/38 84/DIG. 12 |
| 4,450,742 A * | 5/1984 | Sugiura | G10H 1/38 84/715 |
| 4,926,737 A * | 5/1990 | Minamitaka | G10H 1/0025 84/DIG. 12 |
| 4,982,643 A * | 1/1991 | Minamitaka | G10H 1/36 84/613 |

(Continued)

FOREIGN PATENT DOCUMENTS

| | | | |
|---|---|---|---|
| CA | 2929213 C * | 7/2019 | G06F 3/0481 |
| EP | 2737475 A1 | 6/2014 | |

(Continued)

OTHER PUBLICATIONS

International Search Report and Written Opinion for International Application No. PCT/US2021/016342 dated Apr. 28, 2021.

*Primary Examiner* — Christina M Schreiber
(74) *Attorney, Agent, or Firm* — Wolf, Greenfield & Sacks, P.C.

(57) ABSTRACT

Described herein are techniques for adjusting notes of a first musical piece based on chord data of a second musical piece. A first musical piece is accessed, wherein the first musical piece comprises a plurality of notes. Chord data associated with a second musical piece is accessed. One or more of the plurality of notes are compared to the chord data. An aspect of the one or more of the plurality of notes is changed based on the comparison.

21 Claims, 5 Drawing Sheets

(56) References Cited

U.S. PATENT DOCUMENTS 5,052,267 A * 10/1991 Ino .................... G10H 1/38 84/613
5,375,501 A * 12/1994 Okuda .................... G10H 1/0025 84/DIG. 12
5,451,709 A * 9/1995 Minamitaka .................... G10H 1/36 84/613
5,900,567 A * 5/1999 Fay .................... G10H 1/20 84/657
6,057,503 A * 5/2000 Shinsky .................... G10H 1/0025 84/657
6,156,965 A * 12/2000 Shinsky .................... G10H 1/0058 84/657
6,156,966 A * 12/2000 Shinsky .................... G10H 1/38 84/657
7,705,231 B2 * 4/2010 Morris .................... G10H 1/36 84/613
7,902,446 B2 * 3/2011 Humphrey .................... G06Q 50/00 84/470 R
8,026,436 B2 * 9/2011 Hufford .................... G10H 1/40 84/649
2004/0216584 A1 * 11/2004 Audigane .................... G10G 1/02 84/470 R
2009/0260507 A1 * 10/2009 Gannon .................... G10H 1/0025 84/613
2010/0095829 A1 * 4/2010 Edwards .................... G10H 1/365 84/625
2010/0307321 A1 * 12/2010 Mann .................... G10H 1/38 84/613
2013/0025437 A1 * 1/2013 Serletic .................... G10H 1/0025 84/634
2016/0210947 A1 * 7/2016 Rutledge .................... G10G 1/04
2019/0295518 A1 * 9/2019 Ishioka .................... G10H 1/38
2019/0378482 A1 * 12/2019 Vorobyev .................... G10H 1/0025
2021/0241732 A1 * 8/2021 Brosius .................... G10H 1/38

FOREIGN PATENT DOCUMENTS

EP 2737475 B1 * 2/2017 .................... G06F 3/0481
GB 2226177 A * 6/1990 .................... G10H 1/40
GB 2226177 A 6/1990
JP 6428853 B2 * 11/2018 .................... G10H 1/0025
JP 6428853 B2 11/2018
WO WO 98/02867 A1 1/1998
WO WO-9802867 A1 * 1/1998 .................... G10H 1/0025
WO WO 2013/028315 A1 2/2013
WO WO-2013028315 A1 * 2/2013 .................... G10H 1/0025

* cited by examiner

TECHNIQUES FOR PROCESSING CHORDS OF MUSICAL CONTENT AND RELATED SYSTEMS AND METHODS

CROSS-REFERENCE TO RELATED APPLICATIONS

This application claims the benefit under 35 U.S.C. 119(e) of U.S. Provisional Patent Application No. 62/970,619, titled "TECHNIQUES FOR PROCESSING CHORDS OF MUSICAL CONTENT AND RELATED SYSTEMS AND METHODS," filed Feb. 5, 2020, which is incorporated by reference herein in its entirety.

BACKGROUND

Traditional music performance often requires knowledge of music theory and the ability to play an instrument. For example, in order to create organized melodic sounds that would be considered "music," a performer needs to be able to play a musical instrument or at least be able to strike the instrument's "actuators" (e.g., keys of a music keyboard, strings of a stringed instrument such as a guitar). The performer also needs to play the actuators at appropriate times (e.g., in some order and timing appropriate for the time signature and tempo of the piece of music, song, or melody being played by the performer on the instrument). Therefore, playing harmonized music using musical instruments can be especially difficult for amateur instrument players.

Some electronic devices can provide a virtual environment to compose and play musical sound digitally. However, manipulating such a virtual environment can be difficult and may require specific software expertise, as well as knowledge of music theory. While some environments may automatically perform some aspects of the musical manipulation, the environments typically do not take into consideration a number of aspects relevant to the composition, including aspects of the musical compositions being composed, which can result in poor sound quality and/or a poor user experience.

SUMMARY

Described herein are techniques for creating musical compositions of musical pieces. The techniques include using a chord progression for the composition to modify notes of the musical pieces so that the modified musical pieces are musically compatible with aspects of the composition, such as a current key, a current scale, and/or the current chord progression of the musical composition.

According to one aspect, a computer-implemented method is provided for adjusting notes of a first musical piece based on chord data of a second musical piece. The method includes accessing a first musical piece, wherein the first musical piece comprises a plurality of notes, accessing chord data associated with a second musical piece, comparing one or more of the plurality of notes to the chord data, and changing, based on the comparison, an aspect of the one or more of the plurality of notes.

In some examples, accessing chord data includes accessing a chord progression of the second musical piece, comprising a set of chords determined based on a set of harmonic changes of the second musical piece, and a chord scale for each chord in the chord progression, wherein the chord scale comprises a set of consonant notes and a set of dissonant notes.

In some examples, accessing the first musical piece comprises accessing data indicative of a function of each of the plurality of notes of the first musical piece, accessing the chord data comprises accessing data indicative of a function of each note of the second musical piece, and comparing the one or more of the plurality of notes to the chord data comprises comparing, for each note of the plurality of notes, the function of the note to the function of a corresponding note of the second musical piece.

In some examples, changing an aspect of the one or more notes includes moving a note of the plurality of notes to a new note based on the comparison.

In some examples, the method further includes changing a first key of the first musical piece to a second key of the second musical piece.

In some examples, the method further includes storing a set of music clips, wherein each music clip comprises a different chord progression, chord scale, and/or both, and wherein changing the one or more notes comprises determining a clip from the set of clips to use with the second musical piece.

In some examples, accessing the chord data associated with the second musical piece includes determining a chord change to a new chord of the second musical piece, and determining the clip from the set of clips to use with the second musical piece includes determining a music clip from the set of music clips associated with the new chord, wherein the determined music clip comprises an associated chord progression, chord scale, or both with one or more notes that are different than the plurality of notes, and using the determined music clip instead of the plurality of notes.

According to one aspect, a non-transitory computer-readable media is provided with instructions that, when executed by one or more processors on a computing device, are operable to cause the one or more processors to perform accessing a first musical piece, wherein the first musical piece comprises a plurality of notes, accessing chord data associated with a second musical piece, comparing one or more of the plurality of notes to the chord data, and changing, based on the comparison, an aspect of the one or more of the plurality of notes.

In some examples, accessing chord data includes accessing a chord progression of the second musical piece, comprising a set of chords determined based on a set of harmonic changes of the second musical piece, and a chord scale for each chord in the chord progression, wherein the chord scale comprises a set of consonant notes and a set of dissonant notes.

In some examples, accessing the first musical piece comprises accessing data indicative of a function of each of the plurality of notes of the first musical piece, accessing the chord data comprises accessing data indicative of a function of each note of the second musical piece, and comparing the one or more of the plurality of notes to the chord data comprises comparing, for each note of the plurality of notes, the function of the note to the function of a corresponding note of the second musical piece.

In some examples, changing an aspect of the one or more notes comprises moving a note of the plurality of notes to a new note based on the comparison.

In some examples, the instructions are further configured to cause the one or more processors to change a first key of the first musical piece to a second key of the second musical piece.

In some examples, the instructions are further configured to cause the one or more processors to store a set of music clips, wherein each music clip comprises a different chord progression, chord scale, and/or both, and wherein changing the one or more notes comprises determining a clip from the set of clips to use with the second musical piece.

In some examples, accessing the chord data associated with the second musical piece comprises determining a chord change to a new chord of the second musical piece, and determining the clip from the set of clips to use with the second musical piece includes determining a music clip from the set of music clips associated with the new chord, wherein the determined music clip comprises an associated chord progression, chord scale, or both with one or more notes that are different than the plurality of notes, and using the determined music clip instead of the plurality of notes.

According to one aspect, a system is provided including a memory storing instructions, and one or more processors configured to execute the instructions to perform accessing a first musical piece, wherein the first musical piece comprises a plurality of notes, accessing chord data associated with a second musical piece, comparing one or more of the plurality of notes to the chord data, and changing, based on the comparison, an aspect of the one or more of the plurality of notes.

In some examples, accessing chord data includes accessing a chord progression of the second musical piece, comprising a set of chords determined based on a set of harmonic changes of the second musical piece, and a chord scale for each chord in the chord progression, wherein the chord scale comprises a set of consonant notes and a set of dissonant notes.

In some examples, accessing the first musical piece comprises accessing data indicative of a function of each of the plurality of notes of the first musical piece, accessing the chord data comprises accessing data indicative of a function of each note of the second musical piece, and comparing the one or more of the plurality of notes to the chord data includes comparing, for each note of the plurality of notes, the function of the note to the function of a corresponding note of the second musical piece.

In some examples, changing an aspect of the one or more notes comprises moving a note of the plurality of notes to a new note based on the comparison.

In some examples, the instructions are further configured to cause the one or more processors to change a first key of the first musical piece to a second key of the second musical piece.

In some examples, the instructions are further configured to cause the one or more processors to store a set of music clips, wherein each music clip comprises a different chord progression, chord scale, and/or both, and wherein changing the one or more notes comprises determining a clip from the set of clips to use with the second musical piece.

In some examples, accessing the chord data associated with the second musical piece includes determining a chord change to a new chord of the second musical piece, and determining the clip from the set of clips to use with the second musical piece includes determining a music clip from the set of music clips associated with the new chord, wherein the determined music clip comprises an associated chord progression, chord scale, or both with one or more notes that are different than the plurality of notes, and using the determined music clip instead of the plurality of notes.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
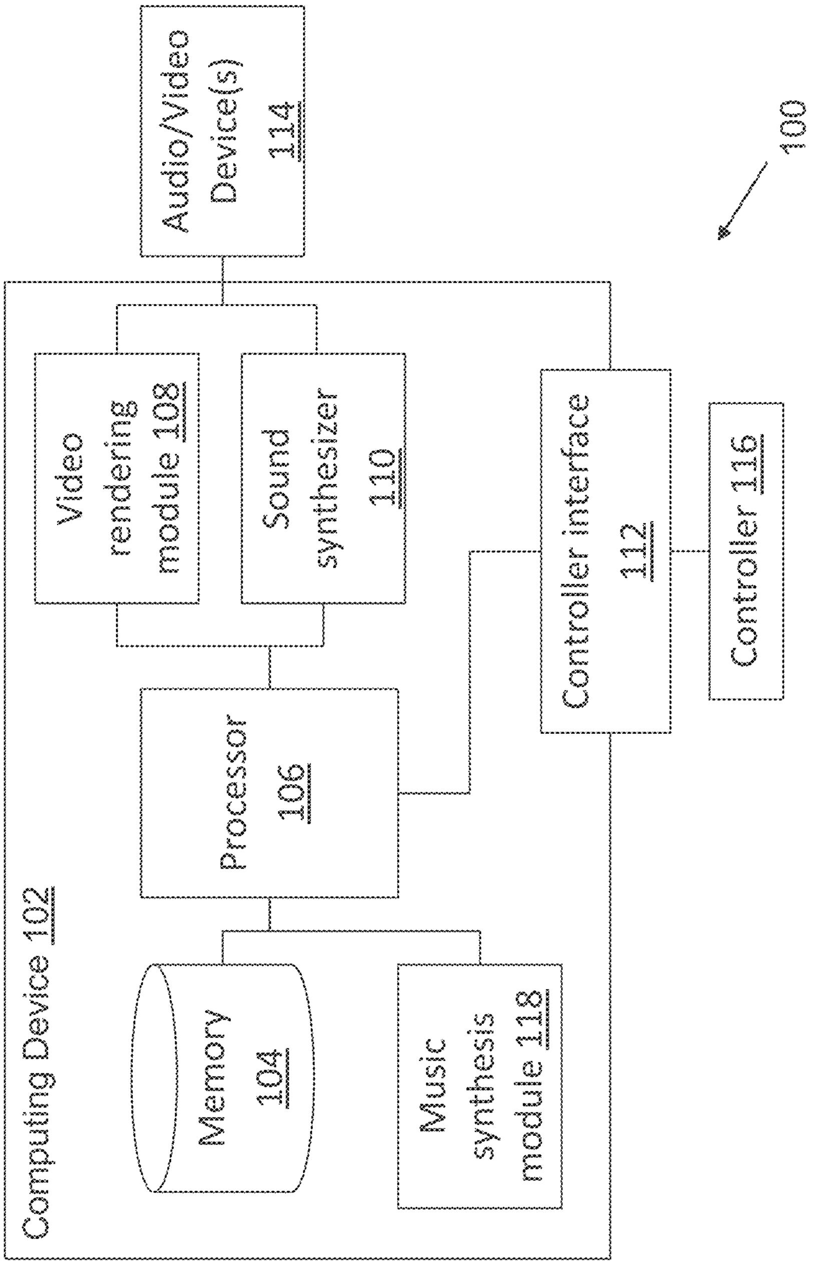
FIG. 1 is a block diagram of an exemplary platform in accordance with some embodiments of the technology described herein.

It can be desirable to combine one musical composition (e.g., which contains one or more musical pieces) with another musical composition (e.g., a master composition with one or more associated musical pieces), such as to create a mix or mash-up for audio synthesis, video game play, and/or the like. When combining musical compositions, systems can adjust the key and/or tempo of one or both of the compositions. In order to play the composition for an extended duration, the musical compositions can be looped over time. However, by not taking into account chord information and/or chord changes when combining the musical compositions, a musical composition may loop in the same key, such that the notes of the composition will not change as chords in the master composition change. As another example, without taking into account the master chord progression, the composition can only achieve a sub-optimal blend, which can negatively impact mixing or game play. As a further example, listening to an unchanging music loop can cause fatigue (e.g., especially in the case of a short measure loop, such as a 1 or 2 measure loop).

The techniques described herein provide for combining musical compositions in a manner that takes into account a chord progression for the composition, such as a chord progression specified by a master composition, master song, master attributes, and/or the like of the mix. By taking into account the chord progression (e.g., in addition to other aspects, such as the master key and/or tempo), the techniques can output notes that are musically compatible with the current key, scale and chord progression of a current musical composition. The techniques can dynamically adjust a music loop to follow a chord progression, which can cause variations in that music loop (e.g., which could lessen or eliminate the feeling of fatigue that could otherwise occur for an unchanging musical loop).

In some embodiments, the chords of the master and the notes of the clip being added to the master can be categorized based on the type of chord or note (e.g., bass, tension, etc.). The system can be configured to analyze the categorizations and to modify the notes of the clip being added based on the master chord progression. The system can use a set of rules to determine whether or not to modify a particular note based on the current chord.

In some embodiments, the system can include a table that stores a set of supported chords (e.g., determined based on common chords in music). The system can also include a database that stores, for each instrument or clip, a plurality of different musical clips that each can be used for one or more chords specified in the table. The system can use the table to determine which of the plurality of musical clips to select for a particular chord of the master.

In some embodiments, the techniques can provide a platform, such as a synthesizing platform, video game platform, and/or the like, that facilitates the creation of a musical composition. The platform can model a musical composition as a simultaneous playback of one or a plurality of musical items or contents. The platform can allow players to control or modify one or more of the plurality of musical contents to generate or synthesize a musical composition. The platform can also allow players to modify musical attributes of the musical composition, both in parts or as a whole, throughout actions or gameplay, thereby generating a variety of musical compositions.

In some embodiments, the system can create a mix of various pieces of musical content, each piece with different keys, tempos, and/or chords, to create a musical composition. For example, the platform can model a musical composition as a simultaneous playback of beats, a bassline, and melody samples or tunes that share not only similar keys and tempos, but also chord progressions. The platform can generate the musical composition as each of the various pieces of music are selected for inclusion in the composition.

In some embodiments, musical content can be associated with (e.g., include) a part of a known song or attributes of a known song. For example, musical content can be a portion or portions of a known song played on the radio and/or available through online streaming platforms. In some embodiments, the musical content can be associated with a genre or attributes of a genre (e.g., rock, rap, and/or the like). This can allow the platform to generate a mashup musical composition, such as a composition that includes parts of other songs and/or a composition that includes multiple genres (e.g., where musical content is included from different genres).

In some embodiments, the platform can be a game platform that provides a gameplay between two or more players using a music synthesis mechanism. The game platform implementing the gameplay can allow two or more players to either (1) compete with each other to create, add, take control over, and/or the like of a musical composition created by the game platform during play, or (2) collaborate with each other to create a musical composition. For example, players can take turns playing different songs or instruments that are each associated with musical content according to gameplay rules, scoring points and building up layers of a musical composition as the songs/instruments are played. The gameplay rules may determine not only when, where and how songs/instruments are played, but also how the played content affects, or is affected by, other content in play, both from the gameplay and the musical point of view. As another example, players can take turns building upon existing works (e.g., works/mixes of previous players), and during gameplay the system can use the techniques described herein to build a musical mix throughout (e.g., including modifying previous content and/or new content).

In some embodiments, the platform can be a game platform that provides a gameplay to a single player. For example, the game platform can enable a player to engage in a game play against a simulated opponent (e.g., computer). The game platform can also enable a player to create a musical composition and/or a musical performance alone.

FIG. 1 is a block diagram of a platform in accordance with some embodiments of the technology described herein. The platform 100 can include a computing device 102. In some embodiments, the computing device 102 can be a dedicated game console, e.g., PLAYSTATION® 3, PLAYSTATION® 4, PLAYSTATION® 5, or PLAYSTATION® VITA manufactured by Sony Computer Entertainment, Inc.; WII™, WII™, U™, NINTENDO 2DS™, NINTENDO 3DS™, NINTENDO SWITCH™, or NINTENDO SWITCH™ LITE manufactured by Nintendo Co., Ltd.; or XBOX®, XBOX 360®, XBOX ONE®, XBOX® SERIES X, or XBOX® SERIES S manufactured by Microsoft Corp. In some embodiments, the computing device 102 can be a computer configured to run a game platform and/or a virtual reality (VR) platform, such as those provided by PLAYSTATION®, XBOX®, Oculus, HTC, Sony, and/or the like. Examples of VR platforms include platforms with one or more spatially tracked controllers that are configured to work with a VR headset, such as the Oculus Rift, Oculus Quest, Oculus Quest 2, HTC Vive, Sony PLAYSTATION® VR, and/or the like. In other embodiments, the computing device 102 can be a general purpose desktop or laptop computer. In other embodiments, the computing device 102 can be a server connected to a computer network. In other embodiments, the computing device 102 can be user equipment. The user equipment can communicate with one or more radio access networks and with wired communication networks. The user equipment can be a cellular phone. The user equipment can also be a smartphone providing services such as word processing, web browsing, gaming, e-user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

The computing device 102 can include a memory device 104, a processor 106, a video rendering module 108, a sound synthesizer 110, a controller interface 112, and a music synthesis module 118. The controller interface 112 can couple the computing device 102 with a controller 116; the video rendering module 108 and the sound synthesizer 110 can connect to one or more audio/video devices 114.

The non-transitory memory 104 can maintain one or more musical items. A musical item can include musical content and/or one or more musical attributes to be associated with the musical content and/or the musical composition as a whole. The memory 104 can also maintain machine-readable instructions for execution on the processor 106.

In some embodiments, the memory 104 can take the form of volatile memory, such as Random Access Memory (RAM) or cache memory. In other embodiments, the memory 104 can take the form of non-volatile memory, including by way of example semiconductor memory devices, e.g., EPROM, EEPROM, and flash memory devices; or magnetic disks, e.g., internal hard disks or removable disks. In some embodiments, the memory 104 can include portable data storage devices, including, for example, magneto-optical disks, and CD-ROM and DVD-ROM disks.

The processor 106 can take the form of a programmable microprocessor executing machine-readable instructions, such as a computer processing unit (CPU). Alternatively, the processor 106 can be implemented at least in part by special purpose logic circuitry, e.g., an FPGA (field programmable gate array) or an ASIC (application-specific integrated circuit) or other specialized circuit. The processor 106 can include a plurality of processing units, each of which may independently operate on an input data, such as a gradient vector. In some cases, the plurality of processing units may be configured to perform an identical operation on different data. For example, the plurality of processing units can be configured in a single-instruction-multiple-data (SIMD) architecture to operate on multiple data using a single instruction. In other cases, the plurality of processing units may be configured to perform different operations on different data. For example, the plurality of processing units can be configured in a multiple-instruction-multiple-data (MIMD) architecture to operate on multiple data using multiple instructions.

The processor 106 can be coupled with the controller interface 112. The controller interface 112 can be implemented in hardware to send and receive signals in a variety of mediums, such as optical, copper, and wireless, and in a number of different protocols some of which may be non-transient.

The controller interface 112 can be coupled with the external controller 116. The external controller 116 can allow a player to interact with the computing device 102. In some embodiments, the external controller 116 can include a game console controller, a mouse, a keyboard, or any other device that can provide communication with the computing device 102. Microphones, controllers, etc. may be connected via a physical wire, e.g., via a USB connection, or may be connected wirelessly, e.g., via Bluetooth, FM, a proprietary wireless protocol used by the Microsoft Xbox One game console, or other wireless signaling protocols.

In some embodiments, the processor 106 can be coupled to a video rendering module 108 and a sound synthesizer 110. The video rendering module 108 can be configured to generate a video display based on instructions from processor 106, while the sound synthesizer 110 can be configured to generate sounds accompanying the video display. The video rendering module 108 and the sound synthesizer 110 can be coupled to an audio/video device 114.

In some embodiments, the one or more audio/video devices 114 can include a display device, e.g., a CRT (cathode ray tube), LCD (liquid crystal display) monitor, or LED (light emitting diode) monitor, a television, an integrated display, e.g., the display of a PLAYSTATION® VITA or Nintendo 3DS, a VR headset, or other type of device capable of displaying video and accompanying audio sounds. While FIG. 1 shows two separate connections into the one or more audio/video devices 114, other embodiments in which the two connections are combined into a single connection are also possible. In some embodiments, one of the audio/video devices 114 can reside in a first system (e.g., a display system) and another one of the audio/video devices 114 can reside in second system (e.g., a sound system).

In some embodiments, the music synthesis module 118 can be configured to synthesize or create a musical composition using one or more musical items in the memory device 104. The music synthesis module 118 can also receive selection information from the controller 116, indicating that a player has selected a particular musical item stored in the memory device 104. The music synthesis module 118 can be configured to generate a musical composition using all of the musical items selected by the player. In some embodiments, the music synthesis module 118 can receive selection information over time. In such cases, the music synthesis module 118 can generate (or update) the musical composition in real-time as the selection information comes in for each musical item. When two or more players perform a gameplay, the music synthesis module 118 can be configured to enforce gameplay rules and generate a musical composition in accordance with the gameplay rules.

In some embodiments, one or more of the modules 108, 110, 118 can be implemented in software using the memory device 104. The software can run on a processor 106 capable of executing computer instructions or computer code. The processor 106 is implemented in hardware using an application specific integrated circuit (ASIC), programmable logic array (PLA), digital signal processor (DSP), field programmable gate array (FPGA), or any other integrated circuit. The processor 106 suitable for the execution of a computer program includes, by way of example, both general and special purpose microprocessors, digital signal processors, and any one or more processors of any kind of digital computer. Generally, the processor 106 receives instructions and data from a read-only memory or a random access memory or both.

In some embodiments, one or more of the modules (e.g., modules 108, 110, 118) can be implemented in hardware using an ASIC (application-specific integrated circuit), PLA (programmable logic array), DSP (digital signal processor), FPGA (field programmable gate array), or other integrated circuit. In some embodiments, two or more modules 108, 110, 118 can be implemented on the same integrated circuit, such as ASIC, PLA, DSP, or FPGA, thereby forming a system on chip. Subroutines can refer to portions of the computer program and/or the processor/special circuitry that implement one or more functions.

The modules 108, 110, 118 can be implemented in digital electronic circuitry, or in computer hardware, firmware, software, or in combinations of them. The implementation can be as a computer program product, e.g., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

While the modules 108, 110, 118 are depicted as separate modules outside of processor 106 (e.g., as stand-alone graphics cards or sound cards), other embodiments are also possible. For example, one or both modules can be implemented as specialized hardware blocks within processor

106. Alternatively, one or more modules 108, 110, 118 can be implemented purely as software running within processor 106.

Different pieces of musical content, such as different songs, instrument solos, musical instrument clips, and/or the like, can have different keys and/or different tempos. Computerized techniques can be used to mix together disparate pieces of musical content. In order for the resulting mix to be cohesive, the pieces of musical content can be mixed together so that the various pieces of musical content play in a similar key and/or tempo. The key and tempo of the musical pieces can shift over time, and therefore one of the musical pieces can be used to set a master key and/or a master tempo at any given moment of time and/or over time (e.g., which therefore changes over time). For example, when playing together multiple musical pieces, the current master key and tempo can be set or determined by the first piece of music played (e.g., selected), such that all subsequently played pieces of music conform to the master (e.g., until the master changes). The master can be, for example, a song file that includes audio data, as described further herein.

Some systems can allow users to construct melodies by using a set of melodic fragments, which can each be short or of limited duration. The system can assemble the fragments into longer melodies. Such melodies can be assembled with other pieces of music, and therefore can also be modified to play back at the master key and tempo. Melodic fragments can be, for example, MIDI files. In some embodiments, MIDI tracks in the file dictate information for specific instruments. The MIDI "notes" in the tracks can be indicators for instrument or song data. Although the MIDI file uses MIDI note numbers, these MIDI notes do not typically correspond to actual note or pitch information. One of skill can appreciate that other file formats can be used by the processor to read data and/or notes. These file formats can include, but are not limited to, text files, binary files, XML files, JSON files, a custom file format, and/or the like.

The techniques described herein provide for adjusting the note and/or chords of different musical pieces so that the chords of one musical piece can be followed by the chords of other musical pieces of a composition. The techniques can allow musical pieces, such as instruments, songs, portions or aspects of songs, and/or the like to follow not only the master key and tempo of the mix, but also a master chord progression. In some embodiments, a mix can have a master chord progression (e.g., in addition to a master key and/or a master tempo). For example, one musical piece of the mix, such as the first-selected musical piece, can be used to determine the master chord progression (e.g., such that at any given time, the mix only has one master chord progression).

As the master song progresses, the chord, tempo, and/or key can change. The techniques described herein can dynamically adjust the notes of a clip (e.g., the notes of an instrument as they are played, the notes of a song being added to the mix, etc.) to different notes or chords to follow the master. For example, if a clip includes the same note at different points of the clip, the generated audio output may be at different notes, chords, and/or keys even though the same note is played. As another example, if a note is played on a particular instrument at different points in the same master song, the generated audio output may be at different notes, chords and/or keys. Such a technique can therefore incorporate a new musical clip into an existing musical composition in a manner that translates the notes of the musical clip to the proper chord and/or key, as necessary, based on the master so that the generated audio output is based on the proper harmonic structure of the particular master aspects of the musical composition.

Following below are more detailed descriptions of various concepts related to, and embodiments of, techniques for matching the chords of musical content. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

A chord can include a set of notes, such as three or more notes, that are consecutively played at a time. In some embodiments, the system can determine data indicative of some or all of the chord progression of a musical piece, where the chord progression can include the series of harmonic changes throughout the piece. In some embodiments, the system can determine data indicative of some or all of the chord scales (e.g., the list of consonant and dissonant scale notes) for some or all of the chords in the chord progression. In some embodiments, each piece of music can carry data indicative of the chord progression and/or chord scales of the progression. For example, a piece of music may include information about its chord progression and the chord scales for each chord in the progression.

Figure 2:
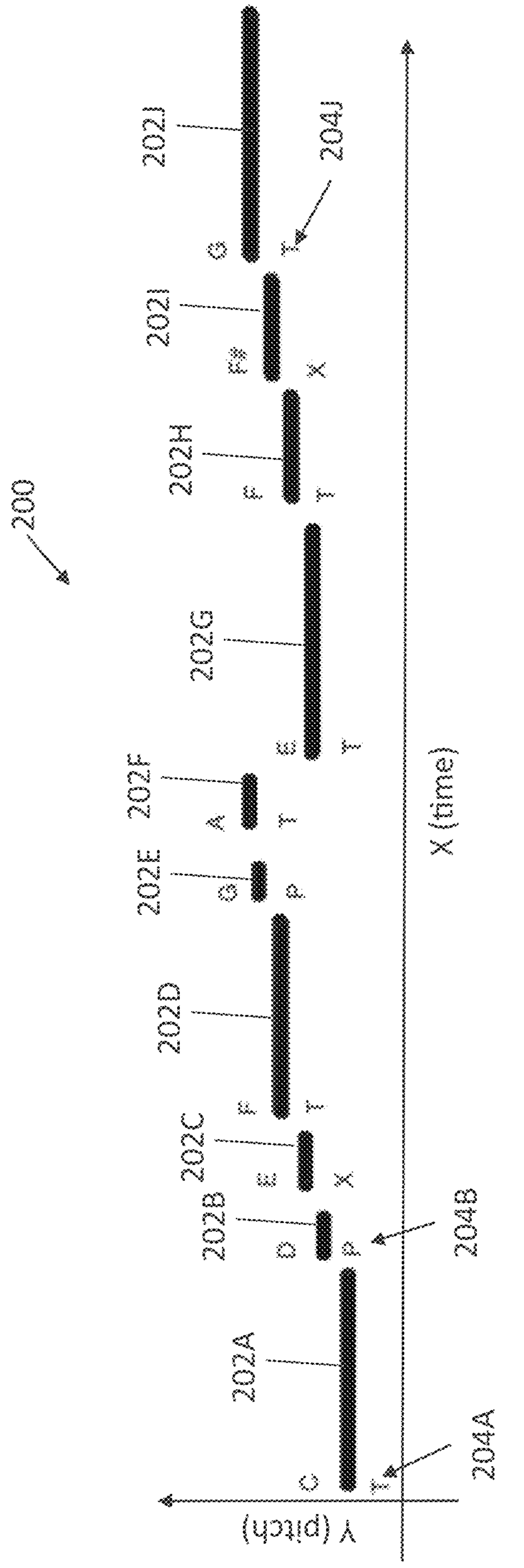
FIG. 2 is a graphical illustration of an example of data of a musical piece, according to some embodiments of the technology described herein.

FIG. 2 is a graphical illustration of an example of data 200 for a musical piece, according to some embodiments. The X axis in FIG. 2 represents time, and the Y axis represents pitch. As described herein, the data 200 can include data of the chord progression and/or chord scales of the musical piece. As shown, the data 200 includes data for a series of notes, shown in this example as notes 202A, 202B, through 202J over time, which are collectively referred to herein as notes 202. The letters above each note represent the note names (e.g., note 202A is a C note, note 202B is a D note, and so on). The data 200 also includes, for each note 202, data indicative of the category of the note, shown as tension [T] 204A for note 202A, passing tone [P] 204B for note 202B, through tension [T] 204J for note 202J. The categories 204A-204J are collectively referred to herein as categories 204. As described further herein, the categories 204 can be used to adjust the notes 202 of the musical piece based on master chord data (e.g., of a second musical piece and/or set for a mix).

Referring to the categories 204, the category for each note can reflect data indicative of how the note functions in the musical piece. In some embodiments, the categories can represent a range of categories from consonant to dissonant. For example, ranging from consonant to dissonant, the categories can include: bass [B], chord [C], tension [T], passing [P], and chromatic [X]. The categories 204 can be indicative of the least consonant category that the note can fit into, while still making musical sense. The bass [B] category can be a note that functions as the bass (e.g., a low note). In some examples, the bass is the root of a chord. The chord [C] tone can be the root, $3^{rd}$ and $5^{th}$ of the chord (e.g., unless already designated as a bass note). In some embodiments, the $6^{ths}$ or $7^{ths}$ can be chord tones (e.g., in 4-note chords). In some embodiments, the $6^{ths}$ or $7^{ths}$ can be tension [T]. The tension [T] can be a consonant note of chord scale, that is not a bass or chord tone. In some embodiments, the tension [T] can be the $6^{th}$, $7^{th}$ and $9^{th}$ for major chords, and $4^{th}$, $7^{th}$ and $9^{th}$ for minor chords. A passing [P] tone can be a dissonant note in the chord scale. Passing tones can be allowable, for example, if the notes resolve by step-wise motion to a consonant note (e.g., a ½ step (semitone) and/or a whole step (2 semitones)). Chromatic [X] can be a dissonant note that is not in the chord scale. Chromatic tones can be allowable, for example, if they resolve quickly (e.g., by a ½ step to another note).

Given the dynamic nature that a musical clip can exhibit (e.g., including changes in key, tempo, and chord progression), the function of a note can change with different chords. For example, a C# might be a chord [C] tone for one chord and a passing [P] tone for another chord. Therefore, the data indicative of the function of the notes and chords of musical pieces can be dynamic throughout the musical piece.

Figure 3:
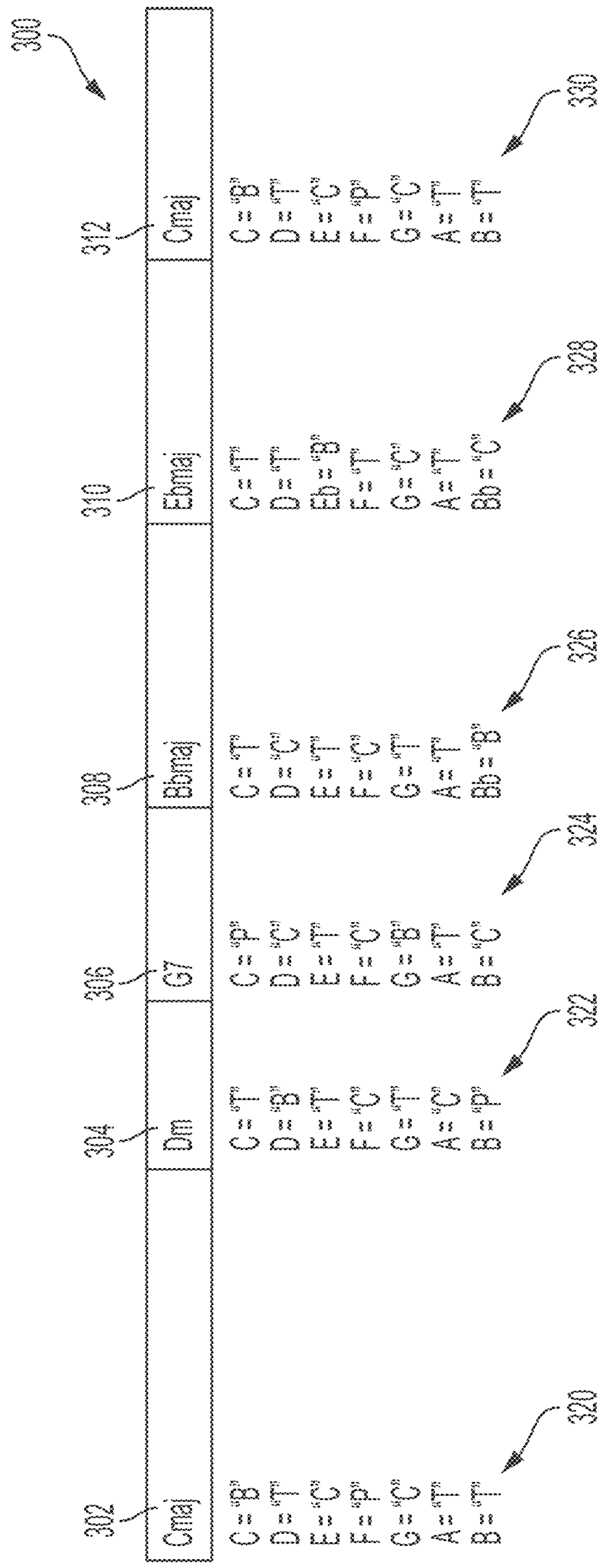
FIG. 3 is a graphical illustration of data indicative of a chord progression, according to some embodiments of the technology described herein.

FIG. 3 shows data indicative of a chord progression 302, according to some embodiments. The chord progression 300 includes exemplary chords Cmaj (C major) 302, Dm (D minor) 304, G7 306, Bbmaj (B flat major) 308, Ebmaj (E flat major) 310, and Cmaj (C major) 312 (where Cmaj 302 is the same chord as Cmaj 312). Each chord 302-312 has an associated chord scale 320-330. For example, C major 302 includes the chord scale 320 with notes C, D, E, F, G, A and B. As shown, each note of the chord scale can be assigned to a category. Continuing with chord scale 320, the categories for the notes are: note C is assigned category [B], note D is assigned category [T], note E is assigned category [C], note F is assigned category [P], note G is assigned category [C], note A is assigned category [T], and note B is assigned category [T]. Referring to chord scale 322, the categories for the notes are: note C is assigned category [T], note D is assigned category [B], note E is assigned category [T], note F is assigned category [C], note G is assigned category [T], note A is assigned category [C], and note B is assigned category [P]. Referring to chord scale 324, the categories for the notes are: note C is assigned category [P], note D is assigned category [C], note E is assigned category [T], note F is assigned category [C], note G is assigned category [B], note A is assigned category [T], and note B is assigned category [C]. Referring to chord scale 326, the categories for the notes are: note C is assigned category [T], note D is assigned category [C], note E is assigned category [T], note F is assigned category [C], note G is assigned category [T], note A is assigned category [T], and note Bb is assigned category [B]. Referring to chord scale 328, the categories for the notes are: note C is assigned category [T], note D is assigned category [T], note Eb is assigned category [B], note F is assigned category [T], note G is assigned category [C], note A is assigned category [T], and note Bb is assigned category [C]. Referring to chord scale 330, the categories for the notes are: note C is assigned category [B], note D is assigned category [T], note E is assigned category [C], note F is assigned category [P], note G is assigned category [C], note A is assigned category [T], and note B is assigned category [T]. While not shown in FIG. 3, the rest of the notes of the chromatic scale that are not part of the chord scale are assigned to category [X].

When a clip is played with a musical composition that has a master chord progression, the clip's notes (e.g., an instrument's notes) can be compared to the chord progression and scale information of the piece of music acting as the current master. The clip's notes can then be adjusted to fit the master. This can be done using various techniques. For example, in some embodiments a rule-based approach can be used to adjust notes. As another example, sets of files (e.g., MIDI clips or files) can be created and used with reference to a chord table. The techniques can use a combination of such techniques, depending on what works best for each individual instrument type.

Figure 4:
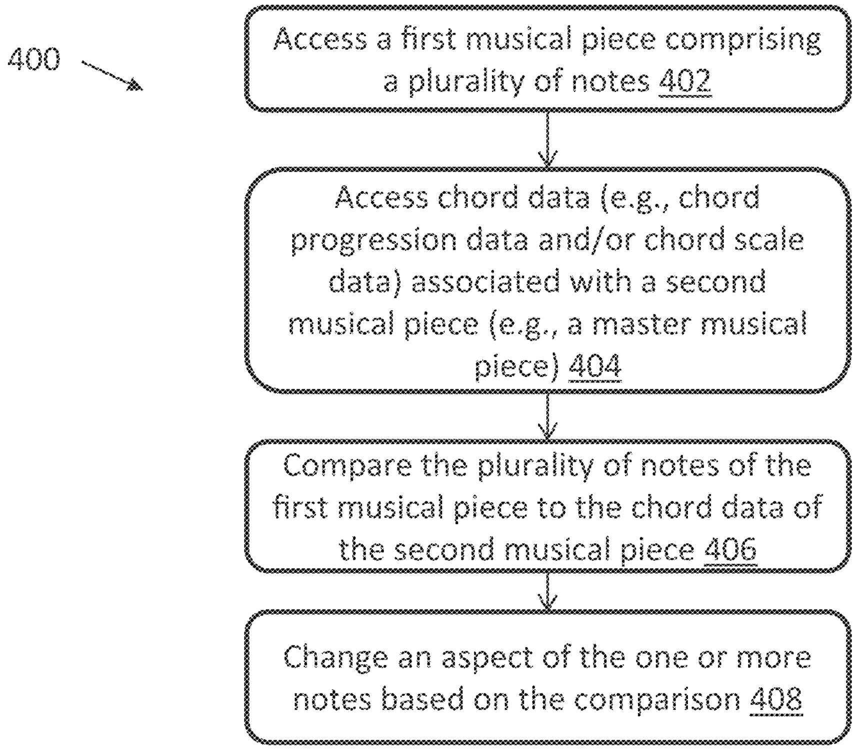
FIG. 4 shows an exemplary computerized method for adjusting notes of a first musical piece based on chord data of a second musical piece, according to some embodiments of the technology described herein.

FIG. 4 shows an exemplary computerized method 400 for adjusting notes of a first musical piece based on chord data of a second musical piece, according to some embodiments. The method 400 can be executed by, for example, the computing device 102. At step 402, the computing device accesses data for a first musical piece, such as data for a musical piece that is to be modified based on a second (e.g., master) musical piece. The data for the first musical piece can include chord data for a plurality of notes of the musical piece (e.g., chords 202 and/or chord types 204). At step 404, the computing device accesses chord data associated with a second musical piece (e.g., a master musical piece). At step 406, the computing device compares one or more of the plurality of notes of the first musical piece to the chord data of the second musical piece. At step 408, the computing device changes, based on the comparison, an aspect of the one or more notes of the first musical piece.

Referring to steps 402 and/or 404, the chord data for the first and/or second musical pieces can include a chord progression that includes a set of chords (e.g., chords 202) that include consonant note(s) and/or dissonant note(s) determined based on a set of harmonic changes of the musical piece. The data can include a set of chord types and/or a chord scale.

The first musical piece can include or be associated with data that marks the function of each note in the melody. For example, each note can be categorized as bass [B], chord tone [C], tension [T], passing tone [P], or chromatic [X] based on an instrument's melody as it relates to its own chord changes. For example, if the musical piece is represented using a MIDI file, the notes can be marked with appropriate categories using text events or designated MIDI notes. As explained herein, the categorization of each note can depend on the chord (e.g., where note C in Cmaj is categorized as [B] while note C in Dm is categorized as [T]).

The second musical piece can also include or be associated with data that marks the function of each note in the chord scale. For example, each note in the chord scale (e.g., which typically includes seven notes) can be categorized as bass [B], chord tone [C], tension [T], or passing tone [P]. The remaining notes that are not in the chord scale (e.g., which typically includes five notes) can be categorized as chromatic [X]. For example, if the musical piece is represented using a MIDI file, the notes can be marked with appropriate categories using text events or designated MIDI notes.

Referring to steps 406 and 408, in some embodiments the notes of a musical clip (e.g., an instruments notes) can be adjusted to fit the current chord scale by considering the melodic function of each note, such as its consonance or dissonance. As described herein, the master (e.g., including the master key, tempo, and/or chords of the chord scale) can include a category of each note in the chord for a particular time of the master. Similarly, the notes of the first musical piece will have an associated category. In some embodiments, when the melody and the chord progression are mixed or played together, the current melody's note category is compared with the same note in the current scale to determine whether the note needs to be adjusted.

Figure 5:
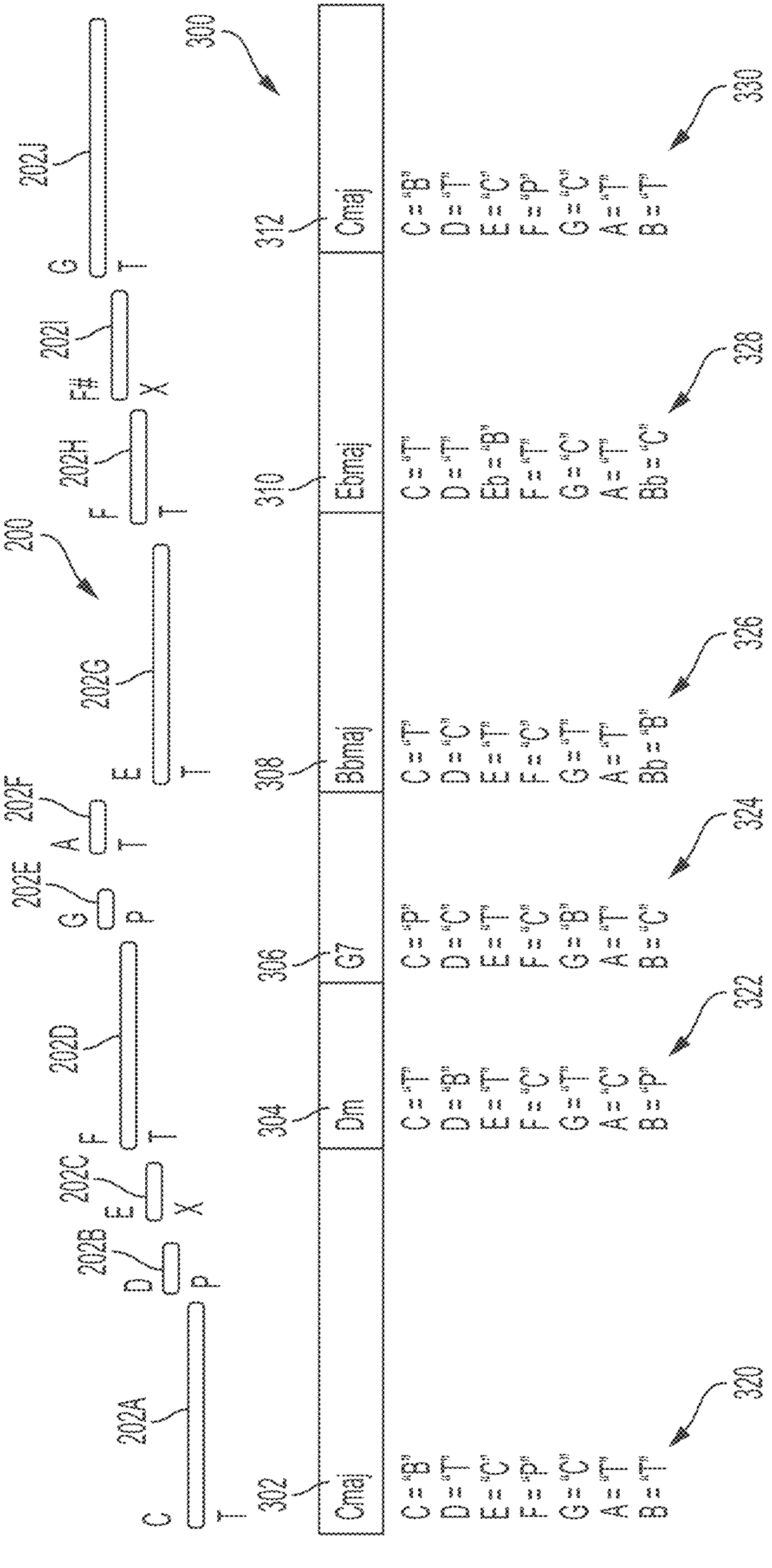
FIG. 5 shows the data of the musical piece from FIG. 2 and the data indicative of a chord progression from FIG. 3, to illustrate examples according to some embodiments of the technology described herein.

FIG. 5 shows the data 200 from FIG. 2 and the data indicative of a chord progression 300 from FIG. 3, to illustrate examples of this comparison process. Recall the exemplary categories, ranging from consonant to dissonant: a bass note [B]; a chord tone [C]; a tension note [T]; a passing note [P]; and a chromatic [X] note. In some embodiments, if the chord scale's assignment of a note is the same as, or more consonant than, the melody's assignment, then the note can be left alone. If the chord scale's assignment of a note is less consonant than the melody's assignment, then the melody note can be moved to a new note that is more consonant (e.g., a note that is at least as consonant as the melody note). For example, as shown in FIG. 5 melody note 202B is assigned category [P], which is the same or more consonant as categories [B], [C], [T], and [P]. Therefore, if the melody note is one of a [B], [C], [T] or [P] for the applicable chord scale, then the note 202B is not adjusted. If the melody note is an [X], then the melody note can be adjusted to a new note that is more consonant (which for this example, would be an [X] note). In this example, the melody note 202B is a C note, which is of category [B] for Cmaj 302, and therefore the C note is not modified.

In some embodiments, the notes of the clip can be transposed to the master key. For example, if using a MIDI file, the MIDI file can be transposed to the master key. The transposing step can be used to transpose the master and the clip into the same key by transposing the clip up or down, as necessary.

In some embodiments, a set of rules can be used to adjust the notes of the clip (e.g., notes of an instrument) to the master chord progression. The system can use the set of rules to compare each of the clip's notes to the original function of the note (e.g., using categories, as described herein) to the chord scales function. Based on the outcome of the comparison, the system may move the clip note to a new note. In some embodiments, the set of rules are applied to the notes of the clip (e.g., without modification). In some embodiments, the set of rules are applied to the notes of the clip after the clip has been modified, such as after the system transposes the notes of the clip to the master key.

An exemplary set of rules are provided below, which are intended to be illustrative of the techniques described herein, but are not intended to be limiting. The exemplary set of rules can include one or more of the following rules:

If the clip's note is a [B] and the chord scale note is a [B], then the system can leave the note as is.

If the clip's note is a [B] and the chord scale note is a [C], [T], [P] or [X], then the system can move the clip's note to the closest [B].

If the clip's note is a [C] and the chord scale note is a [B] or [C], then the system can leave the note as is.

If the clip's note is a [C] and the chord scale note is a [T], then the system can move the clip's note to the closest [B] or [C].

If the clip's note is a [C] and the chord scale note is a [P], then the system can move the clip's note to the closest [B], [C] or [T].

If the clip's note is a [C] and the chord scale note is a [X], then the system can move the clip's note to the closest [B], [C], [T] or [P].

If the clip's note is a [T] and the chord scale note is a [B], [C] or [T], then the system can leave the note as is.

If the clip's note is a [T] and the chord scale note is a [P], then the system can move the clip's note to the closest [B], [C] or [T].

If the clip's note is a [T] and the chord scale note is a [X], then the system can move the clip's note to the closest [B], [C], [T] or [P].

If the clip's note is a [P] and the chord scale note is a [B], [C], [T] or [P], then the system can leave the note as is.

If the clip's note is a [P] and the chord scale note is a [X], then the system can move the clip's note to the closest [B], [C], [T] or [P].

If the clip's note is a [X] and the chord scale note is a [B], [C], [T], [P] or [X], then the system can leave the note as is.

As an illustrative example, referring to FIG. 5, the rules would be applied such that for the example of the musical data 200 for the associated chord progression 300, all of the notes would be left as is:

For note C 202A (category [T]), since the chord scale C note is a [B], note C 202A is left as is.

For note D 202B (category [P]), since the chord scale D note is a [B], note D 202B is left as is.

For note E 202C (category [X]), since the chord scale E note is a [C], note E 202C is left as is.

For note F 202D (category [T]), since the chord scale F note is a [C], note F 202D is left as is.

For note G 202E (category [P]), since the chord scale G note is a [B], the note G 202E is left as is.

For note A 202F (category [T]), since the chord scale A note is a [T], the note A 202F is left as is.

For note E 202G (category [T]), since the chord scale E note is a [T], the note E 202G is left as is.

For note F 202H (category [T]), since the chord scale F note is a [T], the note F 202H is left as is.

For note F #202I (category [X]), since the chord scale F note is a [T], the note F # 202I is left as-is.

For note G 202J (category [T]), since the chord scale G note is a [C], the note G 202J is left as-is.

As a further illustrative example, assume chord 304 in FIG. 5 is changed from Dm to D7, resulting in a new chord-scale (e.g., in place of 322) of C=[C], D=[B], E=[T], F #=[C], G=[P], A=[C], B=[T]. For note F (category [T]) in 202D, since the new chord-scale note F is an [X], because it's not a note in the new chord-scale, then the note F in 202D can be moved to a note that is either a [B], [C], or [T] in the new chord-scale (e.g., to the closest note). For example, the note F can be moved to an F # which is a [C] in the new chord-scale.

As another illustrative example, assume note E in 202G was marked as [B] instead of [T] (e.g., meaning that it functions as the Bass or root note in the clip), then because note E in the chord-scale 326 is a category [T], the note E in 202G (category [B]) can be moved to the closest note that is a [B] in the chord-scale 326, which in this example is the note Bb.

As noted above, the set of rules are exemplary and are not intended to be limiting. In some embodiments, for example, it can be desirable to modify such rules. For example, one or more of the following modifications can be used. Such modifications can be used to provide, for example, refinements similar to those that composers may follow when composing music, which can provide for a realistic-sounding composition.

In some embodiments, the rules may take into account whether the clip note occurs on a chord change. For example, if the clip's note occurs on a chord change, the system can weigh the movement of the note more towards [C] others. Such a technique can be used, for example, for melody notes that land near the moment of a chord change, since it may be desirable to emphasize the chord change. While dissonances can still be allowed, weighting (e.g., the results of the above rules) a little towards more consonant can help reinforce the chord change in the new melody.

In some embodiments, the rules may take into account the length of the clip note. For example, if the clip's note is short (e.g., ⅛$^{th}$ of a note or less) and its movement results in repeated notes not in the original melody, the system can be configured to find an in-between note, even if the in-between note is dissonant. Such techniques can be used, for example, to cause dissonant notes to seem less dissonant when they are short and resolve quickly. As another example, if changing a melody note results in a change (e.g., a significant change) in the shape of a melody, then it may be more musical to maintain the original shape at the expense of allowing more dissonance than normal. For example, if a set of rules changes a step-wise ascending melody so that some notes now repeat, it may be better, musically, to insert a more dissonant note(s) to better-follow to the original shape of the melody.

In some embodiments, the rules may take into account whether the note will resolve step-wise. For example, if the clip's note movement would result in a [P] that won't resolve step-wise, the system can weigh the note towards [B] or [C]. As another example, if the clip's note is held over a chord change where it becomes a [P] or [X] and it resolves step-wise, the system can leave the note as is. As a further example, if the clip's note is held over a chord change where it become a [P] or [X] and does not resolve stepwise, the system can move note to the closest [B], [C], [T] or [P], or a cutoff note. In some embodiments, a combination of such rules can be used to take into account various scenarios regarding step-wise resolution. Such techniques can be used to take into account the fact that what happens immediately after the note in question plays can influence a melodic phrase. In some situations, it may be better to take into account how a note resolves rather than and/or in addition to the relative dissonance or consonance of each individual note.

In some embodiments, the rules may take into account whether the note is a low register note (e.g., below a predetermined note number). For example, if the clip's note is a [T] and is a low register note, the system can weight movement towards [B] or [C], instead of [T]. Such techniques can be used to take into account the fact that the register of a note (e.g., how high or low it is) can affect the note's apparent consonance or dissonance. For example, in a low register, even consonant notes, like chord tones [C] or tensions [T] can start to conflict with the root [B] of a chord. This can be due to, for example, how harmonics in the overtone series interact.

In some embodiments, the rules may take into account a clip type. For example, for instruments, a clip can be classified as a bass instrument if it is a bass guitar, bass keyboard, and/or the like. For example, if the clip's type is a classified as a bass instrument and the note occurs on a chord progression or strong phrase boundary (e.g., every 4 bars) then the system can move the clip note to a [B]. Such techniques can be used, for example, to emphasize a chord change. For example, if the melody clip being adjusted functions within the game as a bass instrument, it may be musically appropriate to have notes that occur right at a chord change be the root [B], which can emphasize the chord change.

In some embodiments, a set of music clips can be stored that each have a different chord progression, chord scale, or both. For example, for a particular musical piece, the system can store a set of clips that each have a different chord progression, chord scale, or both. The system can modify the notes of an original musical clip by determining a clip from the set of clips to use with the second musical piece.

In some embodiments, the system can store a set of audio segments as MIDI file clips (e.g., a set of clips for each of a set of instruments) to fit possible chord progressions or chord scales. The system can be configured to determine the proper MIDI clip to use, such as by using a data table to choose the appropriate clip for the current chord (e.g., by looking up the current chord in the data table and playing a clip associated with the chord). The system can be configured to play back a particular audio segment (e.g., an audio segment for a particular tempo and/or key or chord). In some embodiments, the system can be configured to perform signal processing on the audio segment. For example, the system can perform time shifting or key shifting so that rather than storing each individual tempo and/or key or chord, the system can use a single audio segment to modify that segment into a range of different tempos and keys or chords.

In some embodiments, the system can create a table of desired chords to support, such as based on commons chords found in typical music. In some embodiments, a MIDI database can be used, such as that described in U.S. Pat. No. 9,842,577, titled "Improvised Guitar Simulation," the contents of which are hereby incorporated by reference herein in their entirety. The MIDI database can encode note information according to MIDI format. One of skill can appreciate that MIDI is used as an exemplary format, and that other data formats can be used without departing from the spirit of the techniques described herein.

In the music's MIDI file, each chord change can be marked with a supported chord in the data table. In some exemplary embodiments, the music's MIDI file can also mark a base root (e.g., C, C#, D, etc. . . . ). The root designation can be used, for example, when adjusting to a chord that isn't supported in the table. The combination of a root and a chord from the table can be used to find a suitable replacement for a desired chord that is not explicitly supported in the table. The root can be relative (e.g., an offset) to the current master key, as opposed to being absolute.

For an instrument and/or musical composition, individual MIDI files or clips within a MIDI file can be created to support each chord in the data table. Each MIDI file or clip can be assigned to one or more possible chords in the data table, based on the note content of MIDI clip. For example, a MIDI clip that only uses certain notes may work across many of the chord choices in the table. The MIDI files/clips can be stored in a database.

The system can be configured to use the table and the database of MIDI files or clips of a musical instrument or composition (e.g., where each MIDI file/clip is associated with a different chord progression and/or chord scale) to select an appropriate clip of the instrument or composition for playback. In some embodiments, the system can first transpose the composition or instrument's MIDI file to the master key (e.g., as discussed above). The system can, at each chord change in the piece of music that is functioning as the master chord change, select the appropriate MIDI clip based on the chord markings in the piece of music. For example, at a particular chord change in the master, the system can use the data table to look up the new master chord, and select the clip associated with the chord for playback. In some embodiments, if the table does not include an explicit match for the new master chord, the data table can also include a generic catch-all clip (e.g., that is compatible with essentially any root and/or chord combination). If a new root is designated, the system can be configured to transpose the selected clip to the new root. In some embodiments, if the table does not include an explicit match for the new master chord, the new master chord (e.g., alone and/or in combination with the master root) and the can be used to find a suitable replacement clip, which could be selected by a set of rules to find a close enough match for the new master root and master chord.

As an illustrative example, assume a musical composition can be created using a combination of different beat clips, bass clips, musical instrument clips (e.g., synthesizer, guitar, trumpet, and/or the like), and/or vocal clips. For each clip, the system can store a database of different available versions of the clip that the system can select from using a chord-based index for the associated clip. For example, each clip can be associated with a data table that maps different versions of the clip to chords in the index, such that the version associated with a particular chord should be musically compatible with clip(s) using that chord. A first clip (e.g., a bass, guitar, synthesizer, vocal, etc. clip that includes a root, key and/or chord information) can be added to the musical composition that serves as the master, and sets a master chord progression, master root, key, tempo, and/or the like. As each new clip is added to the musical composition, the clip is matched to the master by following the chord progression and identifying version(s) of the clip based on the chords in the chord progression. As a result, for each clip added, version(s) of the clip are selected for inclusion that follow the master chord progression. In some examples, different versions of different portions of the same clip may be combined over time to match the master chord progression.

In some examples, a current master clip can be replaced by a new master clip. When a new master clip is set for a musical composition, the system can update other clips in the musical composition to follow the chord progression of the new master. In some examples, such updating can include re-configuring the versions used for each clip to match the new chord progression.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This allows elements to optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. “one or the other but not both”) when preceded by terms of exclusivity, such as “either,” “one of,” “only one of,” or “exactly one of.” “Consisting essentially of,” when used in the claims, shall have its ordinary meaning as used in the field of patent law.

Use of ordinal terms such as “first,” “second,” “third,” etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of “including,” “comprising,” “having,” “containing”, “involving”, and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

Various aspects are described in this disclosure, which include, but are not limited to, the following aspects:

1. A computer-implemented method of adjusting notes of a first musical piece based on chord data of a second musical piece, the method comprising: accessing a first musical piece, wherein the first musical piece comprises a plurality of notes; accessing chord data associated with a second musical piece; comparing one or more of the plurality of notes to the chord data; and changing, based on the comparison, an aspect of the one or more of the plurality of notes.
2. The method of 1, wherein accessing chord data comprises accessing: a chord progression of the second musical piece, comprising a set of chords determined based on a set of harmonic changes of the second musical piece; and a chord scale for each chord in the chord progression, wherein the chord scale comprises a set of consonant notes and a set of dissonant notes.
3. The method of any of 1-2, wherein: accessing the first musical piece comprises accessing data indicative of a function of each of the plurality of notes of the first musical piece; accessing the chord data comprises accessing data indicative of a function of each note of the second musical piece; and comparing the one or more of the plurality of notes to the chord data comprises comparing, for each note of the plurality of notes, the function of the note to the function of a corresponding note of the second musical piece.
4. The method of 3, wherein changing an aspect of the one or more notes comprises moving a note of the plurality of notes to a new note based on the comparison.
5. The method of 3, further comprising changing a first key of the first musical piece to a second key of the second musical piece.
6. The method of any of 1-5, further comprising: storing a set of music clips, wherein each music clip comprises a different chord progression, chord scale, and/or both; and wherein changing the one or more notes comprises determining a clip from the set of clips to use with the second musical piece.
7. The method of 6, wherein: accessing the chord data associated with the second musical piece comprises determining a chord change to a new chord of the second musical piece; and determining the clip from the set of clips to use with the second musical piece comprises: determining a music clip from the set of music clips associated with the new chord, wherein the determined music clip comprises an associated chord progression, chord scale, or both with one or more notes that are different than the plurality of notes; and using the determined music clip instead of the plurality of notes.
8. A non-transitory computer-readable media comprising instructions that, when executed by one or more processors on a computing device, are operable to cause the one or more processors to perform: accessing a first musical piece, wherein the first musical piece comprises a plurality of notes; accessing chord data associated with a second musical piece; comparing one or more of the plurality of notes to the chord data; and changing, based on the comparison, an aspect of the one or more of the plurality of notes.
9. The non-transitory computer-readable media of 8, wherein accessing chord data comprises accessing: a chord progression of the second musical piece, comprising a set of chords determined based on a set of harmonic changes of the second musical piece; and a chord scale for each chord in the chord progression, wherein the chord scale comprises a set of consonant notes and a set of dissonant notes.
10. The non-transitory computer-readable media of any of 8-9, wherein: accessing the first musical piece comprises accessing data indicative of a function of each of the plurality of notes of the first musical piece; accessing the chord data comprises accessing data indicative of a function of each note of the second musical piece; and comparing the one or more of the plurality of notes to the chord data comprises comparing, for each note of the plurality of notes, the function of the note to the function of a corresponding note of the second musical piece.
11. The non-transitory computer-readable media of 10, wherein changing an aspect of the one or more notes comprises moving a note of the plurality of notes to a new note based on the comparison.
12. The non-transitory computer-readable media of 10, wherein the instructions are further configured to cause the one or more processors to change a first key of the first musical piece to a second key of the second musical piece.
13. The non-transitory computer-readable media of any of 8-12, wherein the instructions are further configured to cause the one or more processors to: store a set of music clips, wherein each music clip comprises a different chord progression, chord scale, and/or both; and wherein changing the one or more notes comprises determining a clip from the set of clips to use with the second musical piece.
14. The non-transitory computer-readable media of 13, wherein: accessing the chord data associated with the second musical piece comprises determining a chord change to a new chord of the second musical piece; and determining the clip from the set of clips to use with the second musical piece comprises: determining a music clip from the set of music clips associated with the new chord, wherein the determined music clip comprises an associated chord progression, chord scale, or both with one or more notes that are different than the plurality of notes; and using the determined music clip instead of the plurality of notes.

15. A system comprising a memory storing instructions, and one or more processors configured to execute the instructions to perform: accessing a first musical piece, wherein the first musical piece comprises a plurality of notes; accessing chord data associated with a second musical piece; comparing one or more of the plurality of notes to the chord data; and changing, based on the comparison, an aspect of the one or more of the plurality of notes.

16. The system of 15, wherein accessing chord data comprises accessing: a chord progression of the second musical piece, comprising a set of chords determined based on a set of harmonic changes of the second musical piece; and a chord scale for each chord in the chord progression, wherein the chord scale comprises a set of consonant notes and a set of dissonant notes.

17. The system of any of 15-16, wherein: accessing the first musical piece comprises accessing data indicative of a function of each of the plurality of notes of the first musical piece; accessing the chord data comprises accessing data indicative of a function of each note of the second musical piece; and comparing the one or more of the plurality of notes to the chord data comprises comparing, for each note of the plurality of notes, the function of the note to the function of a corresponding note of the second musical piece.

18. The system of 17, wherein changing an aspect of the one or more notes comprises moving a note of the plurality of notes to a new note based on the comparison.

19. The system of 17, wherein the instructions are further configured to cause the one or more processors to change a first key of the first musical piece to a second key of the second musical piece.

20. The system of any of 15-19, wherein the instructions are further configured to cause the one or more processors to: store a set of music clips, wherein each music clip comprises a different chord progression, chord scale, and/or both; and wherein changing the one or more notes comprises determining a clip from the set of clips to use with the second musical piece.

21. The system of 20, wherein: accessing the chord data associated with the second musical piece comprises determining a chord change to a new chord of the second musical piece; and determining the clip from the set of clips to use with the second musical piece comprises: determining a music clip from the set of music clips associated with the new chord, wherein the determined music clip comprises an associated chord progression, chord scale, or both with one or more notes that are different than the plurality of notes; and using the determined music clip instead of the plurality of notes.

The invention claimed is:

1. A computer-implemented method of adjusting notes of a first musical piece based on chord data of a second musical piece, the method being performed by one or more processors configured to execute instructions stored in a memory to perform:

accessing data of a first musical piece, wherein the data of the first musical piece comprises:

a plurality of notes; and data indicative of a function of each of the plurality of notes of the first musical piece;

accessing data of a second musical piece, wherein the data of the second musical piece comprises:

chord data associated with the second musical piece; and data indicative of a function of each of a plurality of notes of the second musical piece;

comparing one or more of the plurality of notes of the first musical piece to the chord data, comprising comparing, for each note of the plurality of notes of the first musical piece, the function of the note to the function of a corresponding note of the plurality of notes of the second musical piece;

changing, based on the comparison, an aspect of the one or more of the plurality of notes of the first musical piece, comprising changing the function of a note of the first musical piece if the function of the note of the first musical piece is different from the function of the corresponding note of the second musical piece; and combining the first musical piece and the second musical piece, taking into account the chord data, to dynamically adjust a music loop.

2. The method of claim 1, wherein accessing chord data comprises accessing:

a chord progression of the second musical piece, comprising a set of chords determined based on a set of harmonic changes of the second musical piece; and a chord scale for each chord in the chord progression, wherein the chord scale comprises a set of consonant notes and a set of dissonant notes.

3. The method of claim 1, wherein changing an aspect of the one or more of the plurality of notes of the first musical piece comprises moving a note of the plurality of notes of the first musical piece to a new note based on the comparison.

4. The method of claim 3, wherein a function of the new note matches the function of the corresponding note of the second musical piece.

5. The method of claim 1, further comprising changing a first key of the first musical piece to a second key of the second musical piece.

6. The method of claim 1, further comprising:

storing a set of music clips, wherein each music clip comprises a different chord progression, chord scale, and/or both; and wherein changing an aspect of the one or more of the plurality of notes of the first musical piece comprises determining a clip from the set of clips to use with the second musical piece instead of the plurality of notes of the first musical piece.

7. The method of claim 6, wherein:

accessing the chord data associated with the second musical piece comprises determining a chord change to a new chord of the second musical piece; and determining the clip from the set of clips to use with the second musical piece comprises:

determining a music clip from the set of music clips associated with the new chord, wherein the determined music clip comprises an associated chord progression, chord scale, or both with one or more notes that are different than the plurality of notes of the first musical piece.

8. A non-transitory computer-readable media comprising instructions that, when executed by one or more processors on a computing device, are operable to cause the one or more processors to perform:

accessing data of a first musical piece, wherein the data of the first musical piece comprises:

a plurality of notes; and data indicative of a function of each of the plurality of notes of the first musical piece;

accessing data of a second musical piece, wherein the data of the second musical piece comprises:

chord data associated with the second musical piece; and data indicative of a function of each of a plurality of notes of the second musical piece;

comparing one or more of the plurality of notes of the first musical piece to the chord data, comprising comparing, for each note of the plurality of notes of the first musical piece, the function of the note to the function of a corresponding note of the plurality of notes of the second musical piece;

changing, based on the comparison, an aspect of the one or more of the plurality of notes of the first musical piece, comprising changing the function of a note of the first musical piece if the function of the note of the first musical piece is different from the function of the corresponding note of the second musical piece; and combining the first musical piece and the second musical piece, taking into account the chord data, to dynamically adjust a music loop.

9. The non-transitory computer-readable media of claim 8, wherein accessing chord data comprises accessing:

a chord progression of the second musical piece, comprising a set of chords determined based on a set of harmonic changes of the second musical piece; and a chord scale for each chord in the chord progression, wherein the chord scale comprises a set of consonant notes and a set of dissonant notes.

10. The non-transitory computer-readable media of claim 8, wherein changing an aspect of the one or more of the plurality of notes of the first musical piece comprises moving a note of the plurality of notes of the first musical piece to a new note based on the comparison.

11. The non-transitory computer-readable media of claim 10, wherein a function of the new note matches the function of the corresponding note of the second musical piece.

12. The non-transitory computer-readable media of claim 8, wherein the instructions are further configured to cause the one or more processors to change a first key of the first musical piece to a second key of the second musical piece.

13. The non-transitory computer-readable media of claim 8, wherein the instructions are further configured to cause the one or more processors to:

store a set of music clips, wherein each music clip comprises a different chord progression, chord scale, and/or both; and wherein changing an aspect of the one or more of the plurality of notes of the first musical piece comprises determining a clip from the set of clips to use with the second musical piece instead of the plurality of notes of the first musical piece.

14. The non-transitory computer-readable media of claim 13, wherein:

accessing the chord data associated with the second musical piece comprises determining a chord change to a new chord of the second musical piece; and determining the clip from the set of clips to use with the second musical piece comprises:

determining a music clip from the set of music clips associated with the new chord, wherein the determined music clip comprises an associated chord progression, chord scale, or both with one or more notes that are different than the plurality of notes.

15. A system comprising a memory storing instructions, and one or more processors configured to execute the instructions to perform:

accessing data of a first musical piece, wherein the data of the first musical piece comprises:

a plurality of notes; and data indicative of a function of each of the plurality of notes of the first musical piece;

accessing data of a second musical piece, wherein the data of the second musical piece comprises:

chord data associated with the second musical piece; and data indicative of a function of each of a plurality of notes of the second musical piece;

comparing one or more of the plurality of notes of the first musical piece to the chord data, comprising comparing, for each note of the plurality of notes of the first musical piece, the function of the note to the function of a corresponding note of the plurality of notes of the second musical piece;

changing, based on the comparison, an aspect of the one or more of the plurality of notes of the first musical piece, comprising changing the function of a note of the first musical piece if the function of the note of the first musical piece is different from the function of the corresponding note of the second musical piece; and combining the first musical piece and the second musical piece, taking into account the chord data, to dynamically adjust a music loop.

16. The system of claim 15, wherein accessing chord data comprises accessing:

a chord progression of the second musical piece, comprising a set of chords determined based on a set of harmonic changes of the second musical piece; and a chord scale for each chord in the chord progression, wherein the chord scale comprises a set of consonant notes and a set of dissonant notes.

17. The system of claim 15, wherein changing an aspect of the one or more of the plurality of notes of the first musical piece comprises moving a note of the plurality of notes of the first musical piece to a new note based on the comparison.

18. The system of claim 17, wherein a function of the new note matches the function of the corresponding note of the second musical piece.

19. The system of claim 15, wherein the instructions are further configured to cause the one or more processors to change a first key of the first musical piece to a second key of the second musical piece.

20. The system of claim 15, wherein the instructions are further configured to cause the one or more processors to:

store a set of music clips, wherein each music clip comprises a different chord progression, chord scale, and/or both; and wherein changing an aspect of the one or more of the plurality of notes comprises determining a clip from the set of clips to use with the second musical piece instead of the plurality of notes of the first musical piece.

21. The system of claim 20, wherein:

accessing the chord data associated with the second musical piece comprises determining a chord change to a new chord of the second musical piece; and determining the clip from the set of clips to use with the second musical piece comprises:

determining a music clip from the set of music clips associated with the new chord, wherein the determined music clip comprises an associated chord progression, chord scale, or both with one or more notes that are different than the plurality of notes of the first musical piece.

* * * * *